US012211362B2

(12) United States Patent
Patenaude et al.

(10) Patent No.: US 12,211,362 B2
(45) Date of Patent: Jan. 28, 2025

(54) VEHICLE BEACON MODE

(71) Applicant: GM GLOBAL TECHNOLOGY OPERATIONS LLC, Detroit, MI (US)

(72) Inventors: Russell A. Patenaude, Macomb Township, MI (US); Michael A. Gutierrez, Dearborn Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 197 days.

(21) Appl. No.: 17/970,685

(22) Filed: Oct. 21, 2022

(65) Prior Publication Data
US 2024/0135795 A1 Apr. 25, 2024
US 2024/0233506 A9 Jul. 11, 2024

(51) Int. Cl.
*G08B 21/04* (2006.01)
*G07C 5/08* (2006.01)

(52) U.S. Cl.
CPC .............. *G08B 21/04* (2013.01); *G07C 5/08* (2013.01)

(58) Field of Classification Search
CPC .................................. G08B 21/04; G07C 5/08
USPC ........................................................ 340/573.1
See application file for complete search history.

(56) References Cited

U.S. PATENT DOCUMENTS

| | | | | |
|---|---|---|---|---|
| 5,552,772 A * | 9/1996 | Janky | ................ | G08B 21/0222 340/8.1 |
| 7,518,500 B2 * | 4/2009 | Aninye | .............. | G08B 21/0288 455/92 |
| 8,433,508 B2 * | 4/2013 | Husain | ............... | G08B 21/0261 701/417 |
| 8,493,219 B2 * | 7/2013 | Buck | ...................... | G08B 21/22 455/456.1 |
| 8,547,222 B2 * | 10/2013 | Aninye | ................... | H04L 67/52 340/988 |
| 9,227,484 B1 * | 1/2016 | Justice | ............... | B60H 1/00778 |
| 9,921,290 B2 * | 3/2018 | Kane | ....................... | H04W 4/80 |
| 10,154,401 B2 * | 12/2018 | Olesen | ................ | G08B 25/016 |
| 10,911,889 B2 * | 2/2021 | Puppala | .................... | H04W 4/30 |
| 2009/0233572 A1 * | 9/2009 | Basir | ....................... | H04L 69/40 455/404.1 |
| 2014/0125483 A1 * | 5/2014 | Kane | ....................... | G06Q 10/10 340/539.13 |
| 2021/0136528 A1 * | 5/2021 | Iwata | ..................... | G08B 25/10 |

* cited by examiner

*Primary Examiner* — Eric Blount
(74) *Attorney, Agent, or Firm* — Quinn IP Law

(57) ABSTRACT

Method of using a vehicle to alert to potential risks includes determining that a user of the vehicle will be absent; determining an estimated absence time; and sending an alert to authorities, via a control system, if the user does not return within the estimated absence time. The method may include receiving the estimated absence time from the user, or the control system of the vehicle determines the absence and the estimated absence time. The user may define the absence and input the estimated absence time through a centralized location, such that the alert is sent from the centralized location. Following expiration of the estimated absence time, detecting a pedestrian near the vehicle, and then playing a pre-recorded emergency message through speakers, such that the pedestrian is made aware of the pre-recorded emergency message. Vehicle lights/horn may operate to guide the user, possibly in decaying fashion.

19 Claims, 7 Drawing Sheets

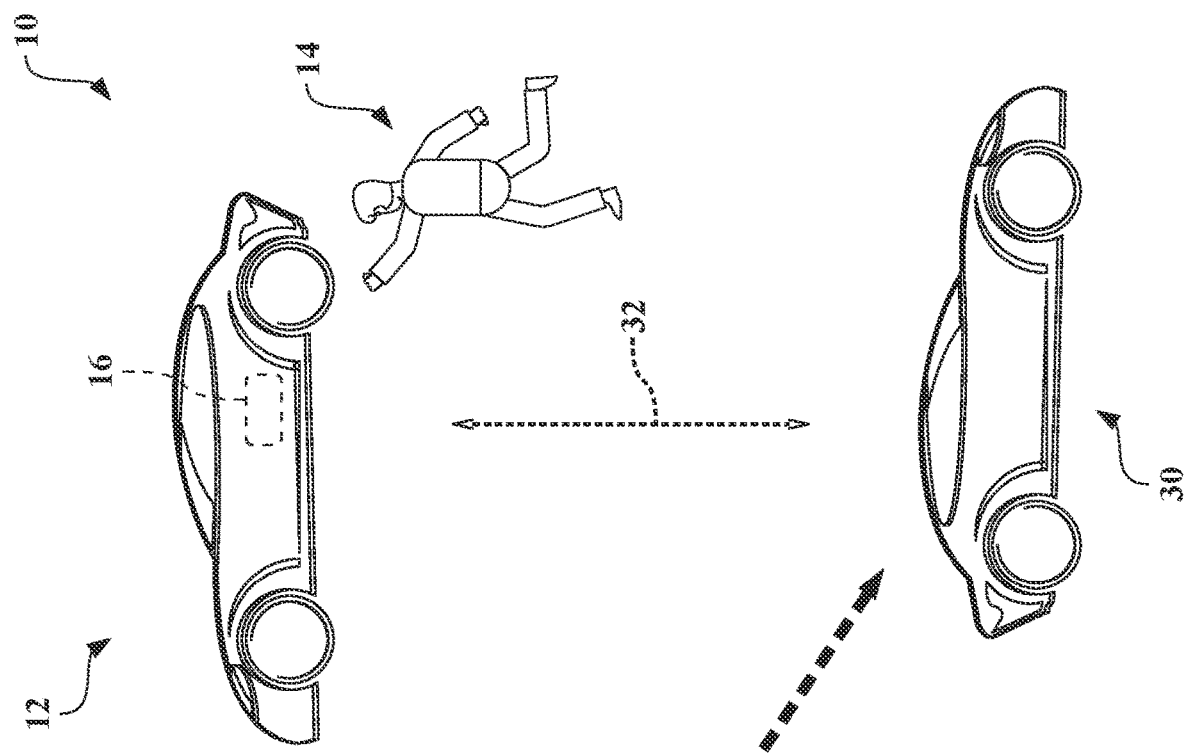
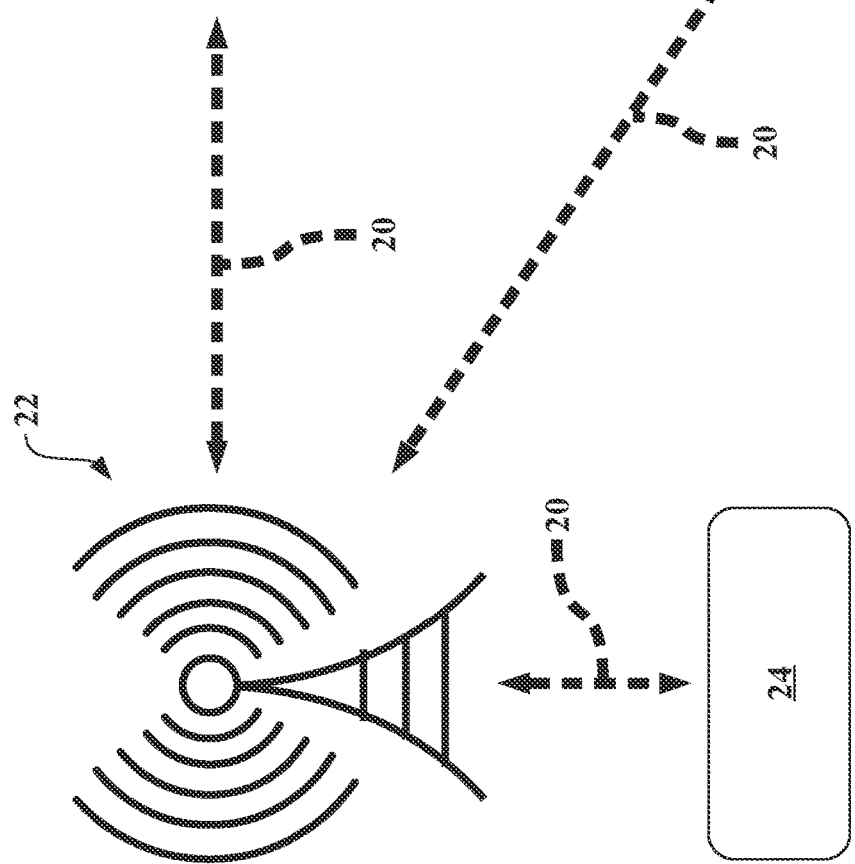
FIG. 1

VEHICLE BEACON MODE

INTRODUCTION

The present disclosure relates to methods for using a vehicle as a beacon to alert authorities or passersby of possible concerns.

SUMMARY

A method of using a vehicle to alert to potential risks is provided. The method includes determining that a user of the vehicle will be absent; determining an estimated absence time; and sending an alert to authorities, via a control system, if the user does not return within the estimated absence time. The method may include receiving the estimated absence time from the user to the control system, or the control system of the vehicle determines the absence and the estimated absence time.

In some situations, the user defines the absence and inputs the estimated absence time to the vehicle through a centralized location, such that the alert is sent to authorities from the centralized location without involvement of the vehicle. The method may determine that the vehicle is likely headed into a non-coverage area, and prompt the user to define a trip registry, via the control system, to the centralized location prior to entering the non-coverage area. The user may enter a user-defined emergency message via the control system, having at least one of: the user's name and date or a trip registry.

In some cases, the method may autonomously drive the vehicle to a coverage area to send the alert to authorities, when the vehicle is parked in a non-coverage area. Furthermore, the method may use vehicle-to-everything (V2X) to send the send the alert to authorities, and the vehicle may be a first vehicle, such that a second vehicle carries the alert to a coverage area, after the first vehicle messages the second vehicle via V2X, and the second vehicle sends the alert to authorities without direct involvement of the first vehicle.

The method may also, following expiration of the estimated absence time, detect a pedestrian near the vehicle. After determining that it is a pedestrian, the method may play a pre-recorded emergency message through one or more speakers of the vehicle, such that the pedestrian is made aware of the pre-recorded emergency message. The method may periodically sound a horn of the vehicle in an SOS pattern or periodically flash lights of the vehicle in an SOS pattern.

A short-range electronic device may be linked with the control system of the vehicle, as an optional part of the method. The short-range electronic device may have biometric sensors. At expiration of the estimated absence time, the method may send the short-range electronic device a short-range alert and allow the user to end or snooze the short-range alert via the short-range electronic device.

All the above may be executed by a non-transitory computer-readable storage medium on which is recorded instructions.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic diagram of a connectivity network or connectivity system for implementing a vehicle beacon mode.

DETAILED DESCRIPTION

Figure 2:
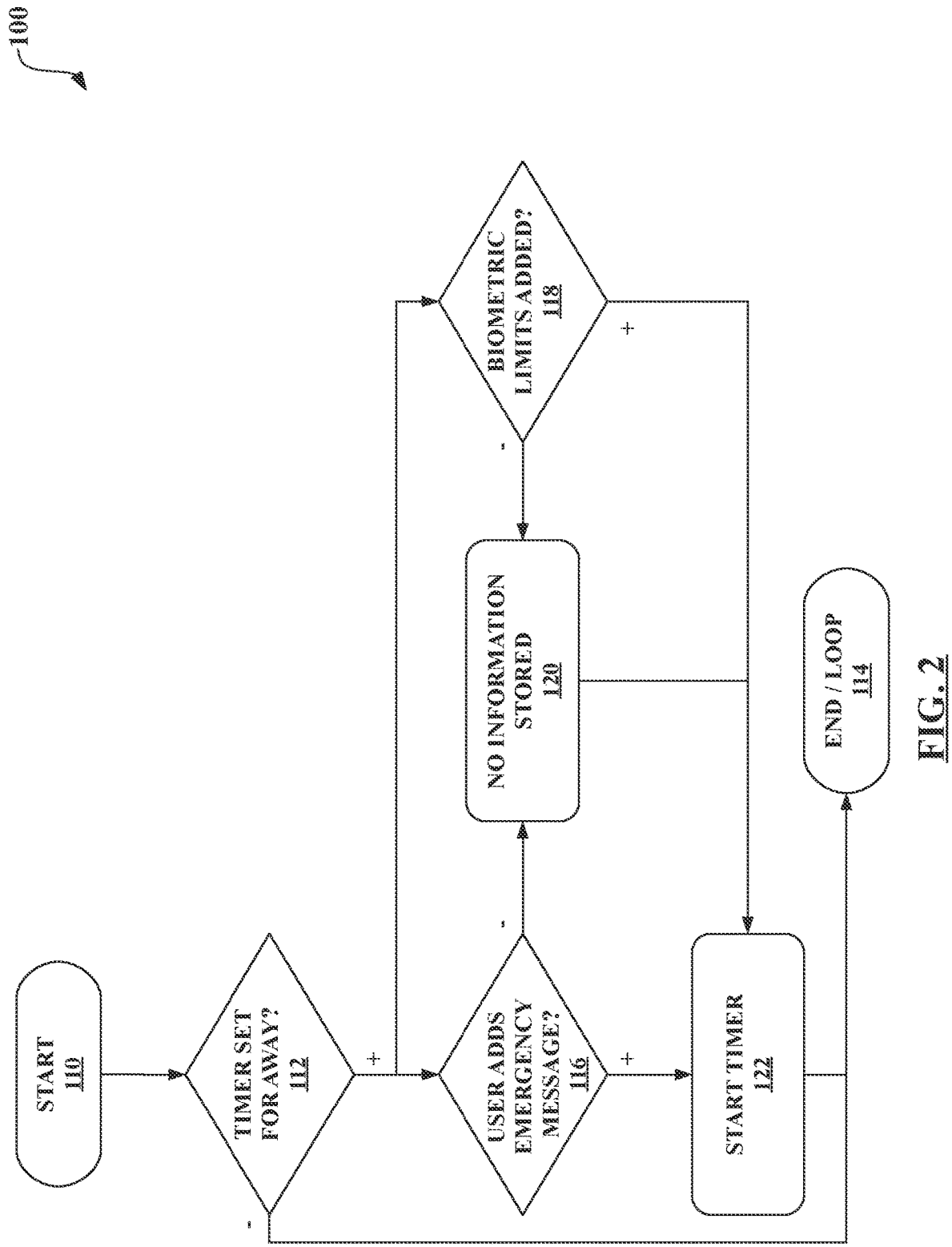
FIG. 2 is a schematic flow chart diagram of an away from vehicle trip registry process.

Referring to the drawings, like reference numbers refer to similar components, wherever possible. FIG. 1 schematically illustrates a method for a connectivity network or connectivity system 10 for using a vehicle, or first vehicle 12, to alert to potential risks by operating as a beacon. The system 10 determines that a user 14, such as a driver or passenger of the first vehicle 12, will likely be absent.

A generalized control system, computing system, or controller 16 is operatively in communication with relevant components of, at least, the first vehicle 12. The controller 16 includes, for example and without limitation, a non-generalized, electronic control device having a preprogrammed digital computer or processor, a memory, storage, or non-transitory computer-readable storage medium used to store data such as control logic, instructions, lookup tables, etc., and a plurality of input/output peripherals, ports, or communication protocols. One or more of the methods described herein may be executed by the controller 16, including the non-transitory computer-readable storage medium, or other structures or equipment recognizable to skilled artisans.

Furthermore, the controller 16 may include, or be in communication with, a plurality of sensors. The controller 16 is configured to execute or implement all control logic or instructions described herein and may be communicating with any sensors described herein or recognizable by skilled artisans. The controller 16 may be dedicated to the specific aspects of the first vehicle 12 described herein, or the controller 16 may be part of a larger control system that manages numerous functions of the first vehicle 12.

In many situations, either the user 14 or the controller 16 determines, or inputs, an estimated absence time. During the estimated absence time, the user 14 is expected to be away from the first vehicle 12. If the user 14 does not return within the estimated absence time, the controller 16 and/or the first vehicle 12 may send an alert to authorities 20, which may also be referred to as alert 20. The authorities may include, without limitation: police, fire, search-and-rescue, or other first responders, as will be recognized by skilled artisans.

The estimated absence time may include a grace period, or a flexible grace based on the specific circumstances, as would be recognized by skilled artisans. The alert 20 may include numerous bits of information, as further discussed herein, and as would be recognized by skilled artisans.

The drawings and figures presented herein are diagrams, are not to scale, and are provided purely for descriptive purposes. Thus, any specific or relative dimensions or alignments shown in the drawings are not to be construed as limiting. While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The term vehicle is broadly applied to any moving or rolling platform. Vehicles into which the disclosure may be incorporated include, for example and without limitation: passenger or freight vehicles; autonomous driving vehicles; industrial, construction, and mining equipment; and various types of aircraft. Additionally, the term vehicle may apply to conventional, electric, or hybrid vehicles.

All numerical values of parameters (e.g., of quantities or conditions) in this specification, including the appended claims, are to be understood as being modified in all instances by the term "about," whether or not the term actually appears before the numerical value. About indicates that the stated numerical value allows some slight imprecision (with some approach to exactness in the value; about or reasonably close to the value; nearly). If the imprecision provided by about is not otherwise understood in the art with this ordinary meaning, then about as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

When used herein, the term "substantially" often refers to relationships that are ideally perfect or complete, but where manufacturing realities prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans will recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

As shown in FIG. 1, the first vehicle 12 may communicate the alert 20 via a communications network 22. The communications network 22 may be, without limitation, a cellular network, satellite communications network, or other communications systems recognizable to those having ordinary skill in the art. Where, or when, the communications network 22 is reachable by the first vehicle 12, that may be considered a coverage area. However, occasionally, the communications network 22 may not be reachable by the first vehicle 12, which may be considered a non-coverage area.

Skilled artisans will recognize that, due to the number of different types of communications systems that may be involved, a coverage area versus a non-coverage area may be flexibly defined relative to the systems and the situations of the user 14 and the first vehicle 12. Additionally, particularly in borderline coverage areas, the first vehicle 12 or the user 14 may be regularly moving between coverage and non-coverage areas.

In some configurations, the user 14 defines the absence and inputs the estimated absence time to the first vehicle 12. Alternatively, the first vehicle 12 may determine the absence and the estimated absence time, likely with the controller 16 or another control system. Note that, as would be recognized by skilled artisans, other systems may be used to determine whether there is a likely absence and to determine the estimated absence time, including, without limitation, a centralized location 24.

In some situations, or configurations, the user 14 may define the absence and/or input the estimated absence time to the first vehicle 12 through the centralized location 24. The centralized location 24 may include features, without limitation, associated with subscription-based communications, in-vehicle security, emergency services, turn-by-turn navigation, and remote diagnostics systems.

One example of the centralized location 24 may be OnStar or similar services. The centralized location 24 may regularly communicate with the vehicle for, without limitation, remote start or locking/unlocking functions, and may utilize one or more cloud-based computing systems. Note that when the user 14 defines the absence, the user 14 may input a password or other biometric lock, such that the alert 20 may not be turned off or snoozed without the password or other biometric lock.

Where the user 14 defines the estimated absence time to the centralized location 24, the alert to authorities 20 may be sent directly from the centralized location 24 without involvement of the first vehicle 12. The alert 20 may include the location, or predicted location, of the first vehicle 12. Sending directly from the centralized location 24 may be particularly beneficial when the first vehicle 12 is in a non-coverage area, such that it would be incapable of sending the alert 20.

Additionally, the alert 20 may include a trip registry, which may have numerous details, including, without limitation: planned parking location, estimated time away from the first vehicle 12, or a planned route for climbing, biking, hiking, or walking. The planned routes may include entering known trails, trail systems, or climbing locations. The centralized location 24 may store all of this information, and more, for use as part of the alert to authorities 20.

In some situations, the methods described herein may determine that the first vehicle 12 is likely headed into a non-coverage area. If this is the case, the controller 16 may prompt the user 14 to define the trip registry to the centralized location 24 prior to entering the non-coverage area. Entering the non-coverage area may be determined based on historic learning of areas traveled or an onboard database/geofence, or lookup table. If entering such an area, the first vehicle 12 may offer a time option with a note that it would be local passerby help only, unless the trip registry is sent to the centralized location 24 prior to entering the non-coverage area. The trip registry may also include the time expected to be in the non-coverage area.

The alert to authorities 20 may include having the user 14 define an emergency message to include with the trip registry. The emergency message may have medical information, including, without limitation, known health conditions, mental or physical disabilities, or other important information for rescuers, as would be recognized by skilled artisans.

Furthermore, in case of emergency (ICE) contacts may be included in the emergency message. Alternatively, or additionally, as part of the alert to authorities 20, the ICE contacts may be automatically contacted via, without limitation, text, phone call, or email with the emergency message and/or trip registry. Alternatively, when entering a non-coverage area, the controller 16 may prompt the user 14 to send the trip registry to ICE contacts, even if the centralized location is not involved.

Where the first vehicle 12 is parked in a non-coverage area, and is equipped with autonomous or semi-autonomous capabilities, the first vehicle 12 may autonomously drive to a coverage area. When moved to the coverage area, the first vehicle 12 is, then, able to send the alert to authorities 20 after leaving the non-coverage area.

Additionally, the methods described herein may include periodically sounding a horn of the first vehicle 12 in an SOS pattern and/or periodically flashing lights of the first vehicle 12 in an SOS pattern. The lights and noise may allow the user 14 to find their way back to the first vehicle 12 based upon either the noise of the horn or the light from the flashing lights.

The first vehicle 12 may be capable of detecting a pedestrian nearby. Therefore, following expiration of the estimated absence time, the methods may communicate a pre-recorded emergency message through one or more speakers of the first vehicle 12, such that the pedestrian is made aware of the pre-recorded emergency message. The pedestrian may be similar to the user 14, as would be recognized by skilled artisans.

Detection of the pedestrian by the first vehicle 12 may include using cameras or other equipment to confirm that it is a human, as opposed to, for example and without limitation, motion detection of an animal. The detection systems may include AI or other recognition mechanisms based on, for example and without limitation, video or radar systems. Where the first vehicle 12 includes only internal speakers, the controller 16 may roll down one or more windows of the first vehicle 12 to communicate or play the pre-recorded emergency message to the pedestrian.

In some situations, a short-range electronic device may be linked with the first vehicle 12. At expiration of the estimated absence time, the first vehicle 12 may send the short-range electronic device a short-range alert. This would allow the user 14 to end or snooze the short-range alert via the short-range electronic device. For example, if the user 14 has simply decided to extend the hiking route further than originally planned, the user 14 may snooze the short-range alert, such that the first vehicle 12 is made aware that the user 14 is not, currently, in danger.

Example short-range electronic devices may include, without limitation: smart phones or tablets, smart watches, glucometers, or blood pressure monitors. In many cases, the short-range electronic devices may be used with, for example and without limitation, Bluetooth or similar short range communication protocols.

Additionally, biometric sensors may be incorporated into many short-range electronic devices. The first vehicle 12 may be monitoring the biometric sensors and determine whether any biometric limits are exceeded. The biometric limits may be associated with the short-range electronic device equipped with that, particular, biometric sensor, and the short-range electronic device may be configured to determine whether the biometric limits are exceeded.

When the short-range electronic device is in range, the first vehicle 12 will collect and/or store biometric information to be shared with first responders and/or emergency contacts in the event that biometric limits are reached, the grace period has ended, or the user 14 has not snoozed or ended the short-range alert. Furthermore, the user 14 may enter biometric limits or maximums to the controller 16 or the centralized location 24.

The first vehicle 12 may also use vehicle-to-everything or V2X 32 to send the alert to authorities 20. V2X 32 may be able to relay the alert 20 to, without limitation, nearby smart phones, which may have coverage or be headed to a coverage area, to other vehicles, or to other systems that are able to communicate the alert to authorities 20. Numerous other connected devices may utilize communications via V2X 32, as will be recognized by those having ordinary skill in the art.

For example, when the first vehicle is in a non-coverage area, a second vehicle 30 may receive the alert 20 from the first vehicle 12. Then, the second vehicle 30 may carry the alert to a coverage area, such that the second vehicle 30 sends the alert to authorities 20 from the coverage area. Alternatively, the second vehicle 30 may have coverage in the same area, such that the second vehicle 30 is able to, substantially immediately, send the alert 20.

The features described herein may be beneficial for, without limitation, hunters or outdoor adventurists, including hikers or bicyclers. Furthermore, the features could be beneficial for people that enter high risk areas as a profession, including, without limitation, law enforcement or home health care professionals.

The flow charts shown schematically in FIGS. 2-6 illustrate some of the steps and processes that may be used to execute the vehicular beacon mode by the first vehicle 12, the second vehicle 30, or via other communications systems or mechanisms. Where decision steps are illustrated, positive (yes) determinations may be shown by a "+" and negative (no) determinations shown by a "−". None of the steps are required, and many of the steps may be reordered, skipped, or moved, as will be recognized by those having ordinary skill in the art.

FIG. 2 is a schematic flow chart diagram of an away from vehicle trip registry process for vehicles, such as the first vehicle 12, illustrated as a process or method 100.

Step 110: START. At step 110 the method 100 initializes or starts. The method 100 may begin operation when called upon by the controller 16, may be constantly running, or may be looping iteratively.

Step 112: TIMER SET FOR AWAY? At step 112 the method 100 determines whether the user 14, or the controller 16, has set a timer for the away period from the first vehicle 12. This may involve the user 14 setting, or inputting, the estimated away time to the first vehicle 12 or to the centralized location 24. Alternatively, the controller 16 may determine—based on, without limitation, the location of the first vehicle 12 or other factors—that the user 14 is likely to be away from the first vehicle 12.

Step 114: END/LOOP. At step 114, the method 100 ends or loops, because the method 100 has determined that no away timer has been set. The end/loop step may then proceed, if necessary, back to the start step 110. If, however, the method determines that an away timer has been set, the method 100 proceeds to steps 116 and 118.

Step 116: USER ADDS EMERGENCY MESSAGE? At step 116 the method 100 determines whether the user 14 defined an emergency message. Note that the emergency message may be, for example and without limitation, stored and/or a standard message that the user 14 has previously chosen. In some instances, and without limitation, the emergency message may be emergency authorities but may also be sent to ICE contacts.

Step 118: BIOMETRIC LIMITS ADDED? At step 118 the method 100 determines whether the user 14 has connected any type of biometric device and/or has added biometric limits to be monitored by the method 100.

Step 120: NO INFORMATION STORED. At step 120, if the determination of either step 116 or step 118 is negative, the method 100 does not store any additional information. If the user neither adds an emergency message nor connects a biometric device, the method may instead use a generic emergency message.

Step 122: START TIMER. Whether steps 116 and 118 are positively or negatively answered, at step 122 the method 100 starts the timer. Note that the length of the timer may be estimated or may be set by the user 14. In some situations, the method 100 may determine the length of the timer by estimating the expected time that the user 14 will be away from the first vehicle 12. Following starting the timer, the method 100 proceeds to the end/loop of step 114.

Figure 3:
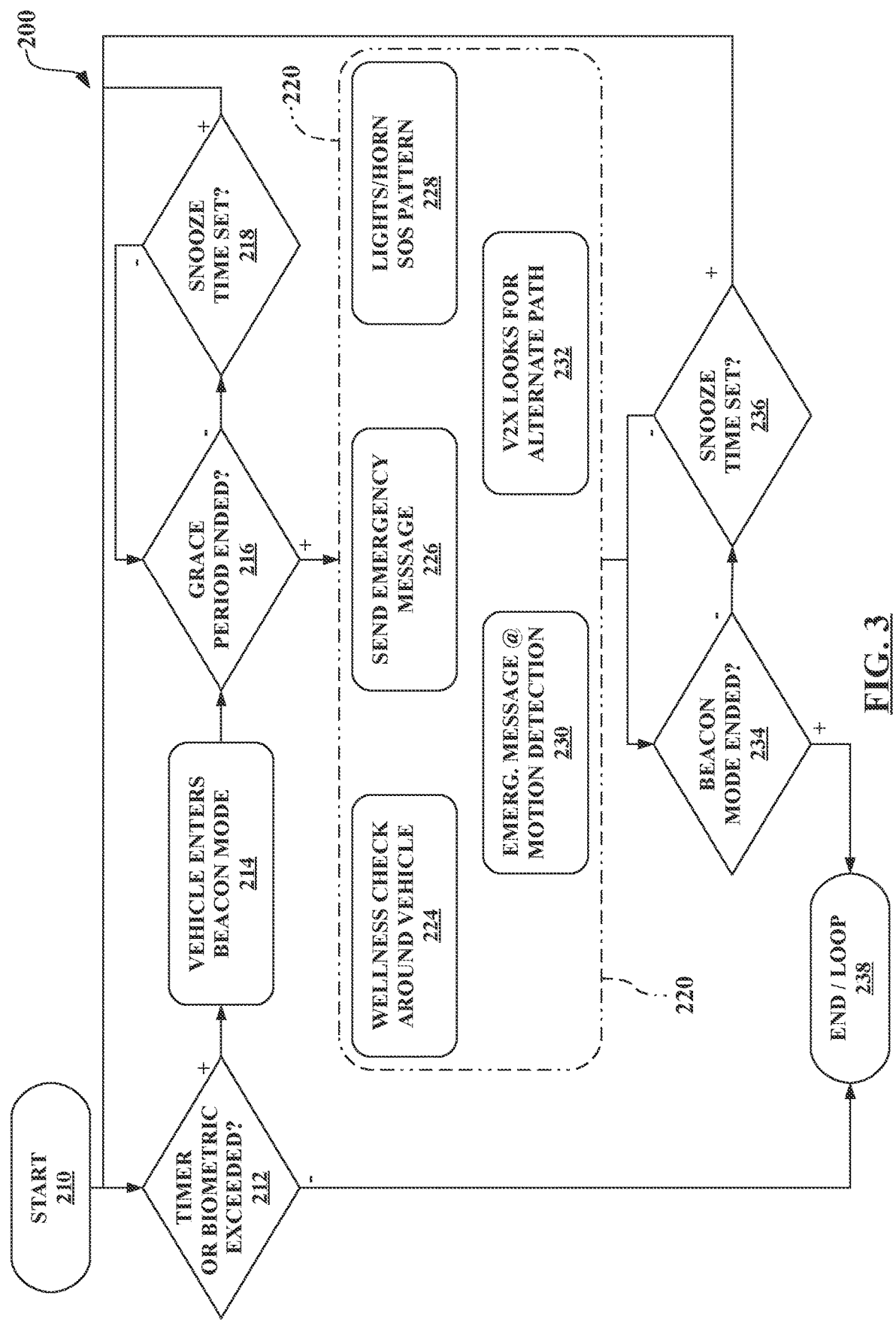
FIG. 3 is a schematic flow chart diagram of an away from vehicle limit exceeded process.

FIG. 3 is a schematic flow chart diagram of an away from vehicle limit exceeded process for vehicles, illustrated as a process or method 200. Note that the method 200 may work in concert with the method 100 shown in FIG. 2, or with the other methods described herein.

Step 210: START. At step 210 the method 200 initializes or starts. The method 200 may begin operation when called upon by the controller 16, may be constantly running, or may be looping iteratively.

Step 212: TIMER OR BIOMETRIC EXCEEDED? At step 212 the method 200 determines whether the timer has ended or any of the biometric limits have been exceeded. As previously discussed, the timer may be set by the user 14, the controller 16, or the centralized location 24. Additionally, biometric devices may be connected with the first vehicle 12. If any of these has triggered, the method 200 proceeds to the beacon mode.

Step 214: VEHICLE ENTERS BEACON MODE. At step 214 the method 200 initiates the beacon mode for the first vehicle 12. The beacon mode will utilize numerous processes and may result in the alert to authorities 20.

Note that initiation of the beacon mode may include audible or visual alerts to the user 14. For example, and without limitation, the horn and/or lights of the first vehicle 12 may sound and/or flash, such that the user 14 recognizes that the beacon mode will begin. Note that a grace period may be used before the beacon mode begins. Additionally, the first vehicle 12 or the centralized location 24 may text or email the user 14 to note that the beacon mode will be entered.

Step 216: GRACE PERIOD ENDED? At step 216 the method 200 determines whether there was a grace period set, relative to the time limits, and whether the grace period has ended. If the grace period has not ended, the method 200 proceeds to step 218.

Step 218: SNOOZE TIME SET? At step 218 the method 200 determines whether there was a snooze time set, such that the grace period is, at least temporarily, moot. If no snooze time was set, the method 200 reverts to step 216 to wait for the grace period to end, possibly with a pause or timer before rechecking the grace period. If the snooze time was set, the method 200 loops back to step 212, as the snooze, substantially, acts as a new timer or extended timer.

Block 220: REMEDIATION MEASURES. If the grace period has ended, the method 200 proceeds to block 220 for numerous remediation measures. The block 220 shows several possible remediation measures, without limitation, which are discussed in detail below. Each of steps 224-232 is a possible remediation measure. However, those having ordinary skill in the art will recognize additional remediation measures that may be taken on behalf of the user 14 by the first vehicle 12, the centralized location 24, or other systems.

Step 224: WELLNESS CHECK AROUND VEHICLE. At step 224 the method 200 attempts to execute a wellness check around the first vehicle 12. This may involve sounds, to which the user 14, or another person, may respond and note whether there is an emergency nearby. Additionally, the sensors of the first vehicle 12, including, without limitation, cameras or radar, may attempt to determine whether there may be an injured person near the first vehicle 12. The wellness check may be particularly useful where the centralized location 24 is in communication with the first vehicle 12.

Step 226: SEND EMERGENCY MESSAGE. At step 224 the method 200 attempts to send an emergency message to authorities, ICE contacts, other emergency responders, or combinations thereof. The emergency message may be sent by the first vehicle 12, the centralized location 24, or both.

Where the first vehicle 12 is in a non-coverage area, the message may need to be sent via the centralized location 24. Note that alternatives exist, as described relating to V2X 32.

Step 228: LIGHTS/HORN OPERATE IN SOS PATTERN. At step 228 the method 200 operates the horn of the first vehicle 12, the lights of the first vehicle 12, or both, in an SOS pattern. In International Morse Code, three dots form the letter "S" and three dashes make the letter "O", such that the lights or horn may use three short bursts, followed by three long bursts, followed by three short bursts, to form the SOS pattern. In general, the SOS pattern is recognized as an alert of some sort, even for those who do not know the Morse code version, and nearby pedestrians will be alerted of some sort of issue.

Note that the light SOS pattern may be limited to nighttime via daylight sensors or preprogrammed timing for the area in which the first vehicle 12 resides or the know location to which it is headed. Furthermore, note that noise may be made through interior or exterior speakers of the first vehicle 12. Any noise or lights by the first vehicle 12 may help guide the user 14 back to the first vehicle 12 if the user 14 does not know where the first vehicle 12 is located or has become disoriented.

Step 230: EMERGENCY MESSAGE WHEN MOTION IS DETECTED NEARBY. At step 230 the method 200 determines that a pedestrian is nearby and plays an audible message for the pedestrian. The method 200 may use sensors, including cameras, radar, or radar-like devices, to sense the presence of the pedestrian and/or to confirm that it is a pedestrian, as opposed to an animal. Furthermore, the recognition systems may also determine, without limitation, if the person is heading the same direction or if they appear to be another hiker or biker (e.g., carrying a backpack or on a bicycle), such that different alerts may be played depending on the recognition levels.

The emergency message would likely play only when the pedestrian is detected within a predefined range. Note that if the horn is sounding in the SOS pattern, the first vehicle 12 may halt that sound in order to better communicate the audio emergency message to the pedestrian.

In some cases, the first vehicle 12 will have external speakers that may be used to play the emergency message to the exterior. However, the first vehicle 12 may not have exterior speakers, such that either the emergency message may be played loudly through the interior speakers, or the windows may be automatically rolled down to communicate the emergency message to the exterior of the first vehicle 12. The emergency message may include, without limitation, name, date, direction headed, and medical information.

Step 232: V2X LOOKS FOR ALTERNATIVE COMMUNICATIONS PATHS. At step 232 the method 200 uses V2X 32 to look for alternative ways to send the emergency message. For example, and without limitation, if the first vehicle 12 is in a non-coverage area and the centralized location did not receive the emergency method prior to entering the non-coverage area, the first vehicle 12 may use V2X 32 to look for the second vehicle 30, or another way to send the emergency message.

In one possible scenario, the first vehicle 12 uses V2X 32 to send the emergency message to the second vehicle 30. When the second vehicle 30 reaches a coverage area—or, if the second vehicle 30 has coverage in that location—it sends the alert to authorities 20 such that the non-coverage area for the first vehicle 12 is negated.

Note that V2X 32 may use other sources of communication to send the alert to authorities 20. For example, even though the first vehicle 12 is in a non-coverage area, for itself, there may be other types of cellular, or other communications networks, available. The first vehicle 12 may be able to use V2X 32 to send the alert 20 via the other, available, networks.

Step 234: BEACON MODE ENDED? Following the block 220 remediation measures, the method 200 determines whether the beacon mode has ended at step 234. The beacon mode may end for numerous reasons, many of which will be recognized by skilled artisans. For example, and without limitation, the beacon mode may decay in frequency, and eventually turn off, in order to preserve the life of the battery—whether a starting, lighting, and ignition (SLI), a hybrid, or an electric vehicle battery.

Wherein the first vehicle 12 is a conventional or hybrid vehicle—having an internal combustion engine—the engine may be automatically turned on to recharge the SLI or hybrid battery. However, the beacon mode would eventually need to end in order to preserve fuel in case the user 14 eventually returns to the first vehicle 12 and needs to drive, such that a minimum driving distance is maintained.

Step 236: SNOOZE TIME SET? If the beacon mode has not ended, at step 236, the method 200 determines whether there was a snooze time set. If no snooze time was set, the method 200 reverts to step 234 to recheck whether the beacon mode has ended, possibly with a pause or timer before the recheck. If the snooze time was set, the method 200 loops back to step 212, as the snooze, essentially, acts as a new timer or extended timer. The snooze request may also be sent through the short-range electronic devices, such as smart watches, available via (without limitation) Bluetooth. Additionally, the snooze request may be sent via email or text, particularly where the user 14 is in a coverage area.

Step 238: END/LOOP. If the beacon mode has ended, at step 238, the method 100 ends or loops, because the method 200 has determined, for example, that nothing additional needs to occur. Furthermore, if step 212 determines that no timer or biometric limits have been set or exceeded, the method also proceeds to step 238. The end/loop step may then proceed, if necessary, back to the start step 210.

Note that, for any, and all, of the methods described herein, the first vehicle 12, the second vehicle 30, the centralized location 24, or another system may act as the beacon, as would be recognized by those having ordinary skill in the art. Furthermore, the one of those systems may utilize another communicative device, such as, without limitation, a smart watch, to send the emergency message on its behalf.

Figure 4:
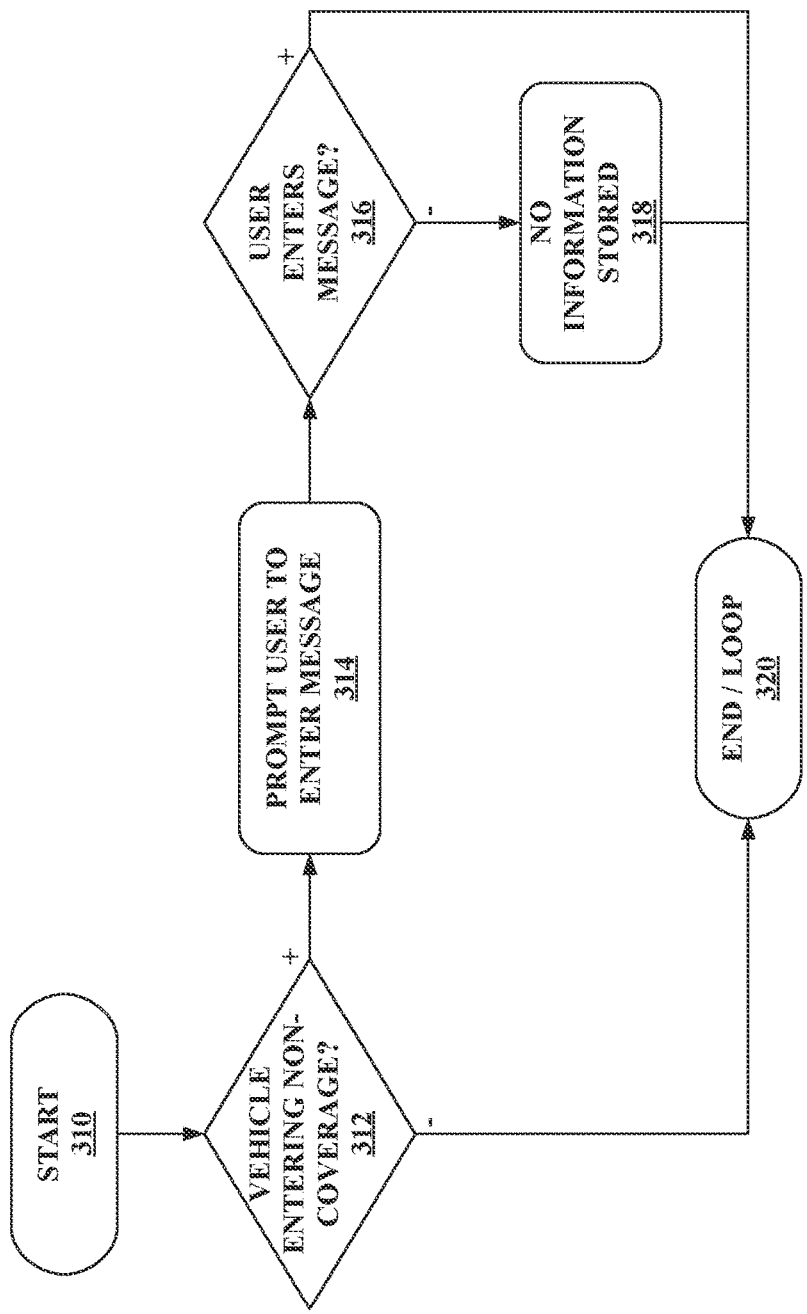
FIG. 4 is a schematic flow chart diagram of an out of coverage area trip registry process.

FIG. 4 is a schematic flow chart diagram of an out of coverage area registry process, illustrated as a process or method 300.

Step 310: START. At step 310 the method 300 initializes or starts. The method 300 may begin operation when called upon by the controller 16, may be constantly running, or may be looping iteratively.

Step 312: VEHICLE ENTERING NON-COVERAGE AREA? At step 312 the method 300 determines whether the vehicle, such as the first vehicle 12, is likely entering a non-coverage area. Whether the vehicle is likely entering the non-coverage area may be determined by turn-by-turn directions communicated to the centralized location 24, such as the first vehicle 12 requesting directions from OnStar. The first vehicle 12 may predict that it is entering the non-coverage area.

Alternatively, the centralized location 24 may determine that the vehicle is likely headed into the non-coverage area, such as, without limitation, based on GPS readings for the first vehicle 12. Note that the first vehicle 12 may also be tied to a smart phone that is giving the user 14 directions, such that the centralized location 24 may be informed that the first vehicle 12 is headed into the non-coverage area via the smart phone.

Step 314: PROMPT USER TO ENTER EMERGENCY MESSAGE. At step 314 the method 300 prompts the user 14 to enter an emergency message, such as the alert to authorities 20. Step 314 may also prompt the user 14 to enter an estimated away time—as opposed to the controller 16 or centralized location 24 estimating an away time—to the centralized location 24.

The estimated away time would generally begin when the first vehicle 12 parks, which may be known or estimated based on, without limitation, the directions provided to the relevant systems. The emergency message may include the alert to authorities 20 and/or the list of ICE contacts to which the emergency message should be sent.

Step 316: USER ENTERS MESSAGE AND/OR ESTIMATED TIME? At step 316 the method 300 determines whether the user 14 actually entered the emergency message and/or whether the user 14 has entered the estimated away time.

Step 318: NO INFORMATION SAVED. At step 318, if the user 14 did not enter the emergency message or the estimated away time, the method 300 will not store or save any information. Note that, as an alternative, the method 300 may utilize a preset or preprogramed emergency message, which may have been set by the user 14.

Step 320: END/LOOP. If the vehicle is not entering a non-coverage area, determined at step 312, the method 300 ends or loops. Furthermore, if step 316 determines that the user has not entered either the emergency message or the estimated away time, the method 300 ends or loops. The end/loop step may then proceed, if necessary, back to the start step 310.

Figure 5:
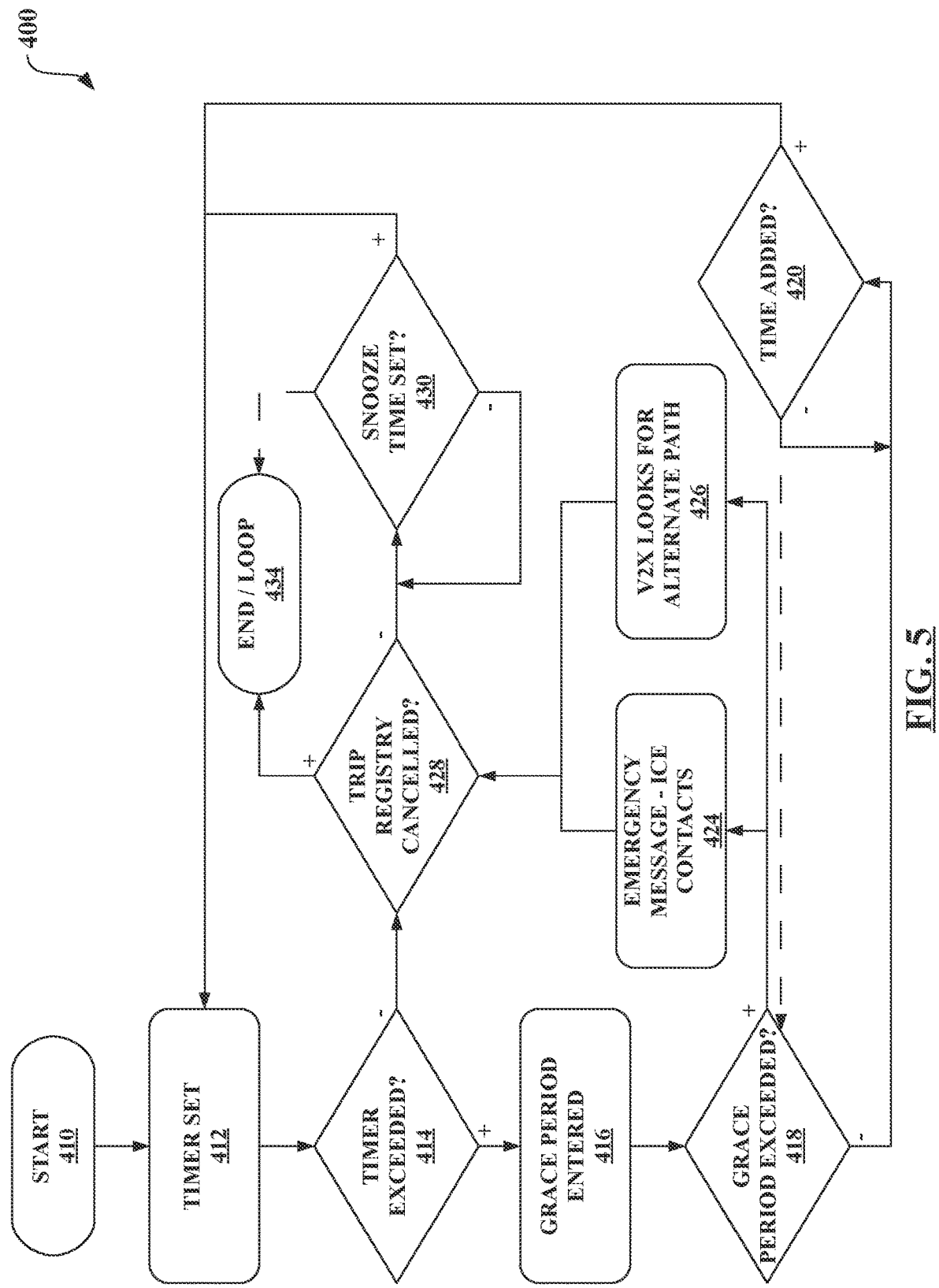
FIG. 5 is a schematic flow chart diagram of an out of coverage area limit exceeded process.

FIG. 5 is a schematic flow chart diagram of an out of coverage area limit exceeded process, illustrated as a process or method 400.

Step 410: START. At step 410 the method 400 initializes or starts. The method 400 may begin operation when called upon by the controller 16, may be constantly running, or may be looping iteratively.

Step 412: SET TIMER. At step 412 the method 400 sets the timer. The duration of the timer may be input by the user 14 or estimated by the controller 16 or the centralized location 24.

Step 414: TIMER EXCEEDED? At step 414 the method 400 determines whether the timer has been exceeded.

Step 416: ENTER GRACE PERIOD. If step 414 determines that the timer has expired, at step 416 the method 400 sets, or enters, the grace period.

Step 418: GRACE PERIOD EXCEEDED? At step 418 the method 400 determines whether the grace period has been exceeded or has expired.

Step 420: TIME ADDED? If step 418 determines that the grace period has expired, at step 420 the method 400 determines whether any additional time has been added to the timer or grace period timer. For example, and without limitation, the first vehicle 12 may communicate via short range communications, such as Bluetooth or similar systems, with the user 14. At expiration of the timer or of the grace period, the user 14 may wish to add additional time.

Note that the first vehicle 12, the controller 16, or the centralized location 24 may give the user 14 the option of inputting a password. Therefore, if the user 14 has selected the password option, the password would be required to add time to the timer or grace period.

If step 420 determines that no time has been added, the method 400 may loop back to see whether the user 14, or the controller 16, will add time. This may involve a delay, before rechecking whether time has been added, and an iteration/loop counter.

If step 420 determines that time has been added by the user 14, the method 400 returns to the timer set step 412. Eventually, after several iterations without time being added, the method 400 may return to step 412 or may return to step 418 to determine whether the grace period has expired.

Step 424: EMERGENCY MESSAGE AND/OR ICE CONTACTS. If step 418 determines that the grace period has expired, at step 424 the method 400 may send an emergency message, such as the alert to authorities 20. Alternatively, or in concert, the method 400 may contact the ICE contacts defined by the user 14. Note that these steps are largely implemented by the centralized location 24, as the first vehicle 12 is in a non-contact area. Therefore, if no emergency message was given to the centralized location 24, the first vehicle 12 may need to use V2X 32 to communicate the emergency message.

Step 426: V2X LOOKS FOR ALTERNATE PATH. Furthermore, if step 418 determines that the grace period has expired, at step 426 the method 400 may look for alternative methods using V2X 32. For example, and without limitation, the first vehicle 12 may look for the second vehicle 30—or any other device capable of carrying the emergency message—and communicate the emergency message to the second vehicle 30. Then, once the second vehicle 30 reaches a coverage area, it may send the emergency message.

Alternatively, to using the V2X 32, the first vehicle 12 may be equipped with autonomous or semi-autonomous capabilities. Therefore, the first vehicle 12 may autonomously drive to a coverage area in order to send the emergency message itself. Note, however, that this feature may be limited, particularly where V2X 32 successfully transfers the emergency message to the second vehicle 30, because the first vehicle 12 may not want to strand the user 14 in the non-coverage area. However, the first vehicle 12 may return to the non-coverage area immediately after sending the emergency message.

Step 428: TRIP REGISTRY CANCELLED? If step 414 determines that the timer has expired, at step 428 the method 400 determines whether the trip registry has been cancelled. This determination may also occur following the emergency message of step 424 and the V2X of step 426. Similar to adding time at step 420, a password may be required to cancel the trip registry.

Step 430: SNOOZE TIME SET? If step 428 determines that the trip registry has not been cancelled, at step 430 the method 400 determines whether the user 14 has requested that the timer or grace period be snoozed. Similar to cancelling the trip registry, a password may be required to set the snooze time.

If step 430 determines that no snooze has been set, the method 400 may loop back to see whether the user 14, or the controller 16, will set a snooze timer. This may involve a delay, before rechecking whether the snooze has been set, and an iteration/loop counter.

If step 430 determines that the snooze has been set, the method 400 returns to the timer set step 412, as the snooze acts as a new timer. Eventually, after several iterations without setting the snooze, the method 400 may return to step 412 or may proceed to the end/loop step 434.

Step 434: END/LOOP. After determining that the trip registry has been cancelled at step 428, the method 400 ends or loops. The end/loop step may then proceed, if necessary, back to the start step 410.

Figure 6A:
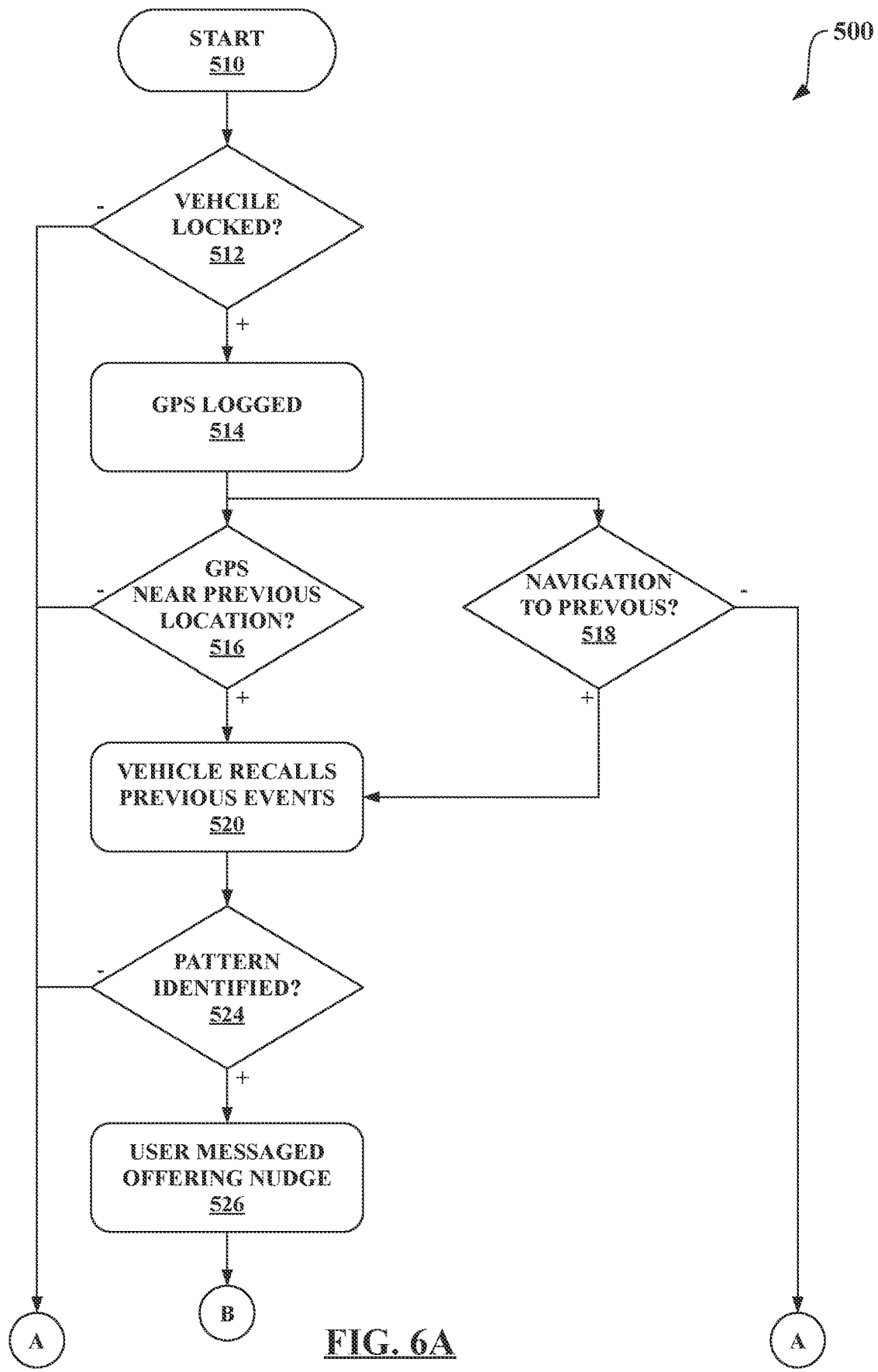
FIG. 6A is a schematic flow chart diagram of a first portion of a process for a vehicle to determine or approximate an estimated absence time and send a nudge to a user.
Figure 6B:
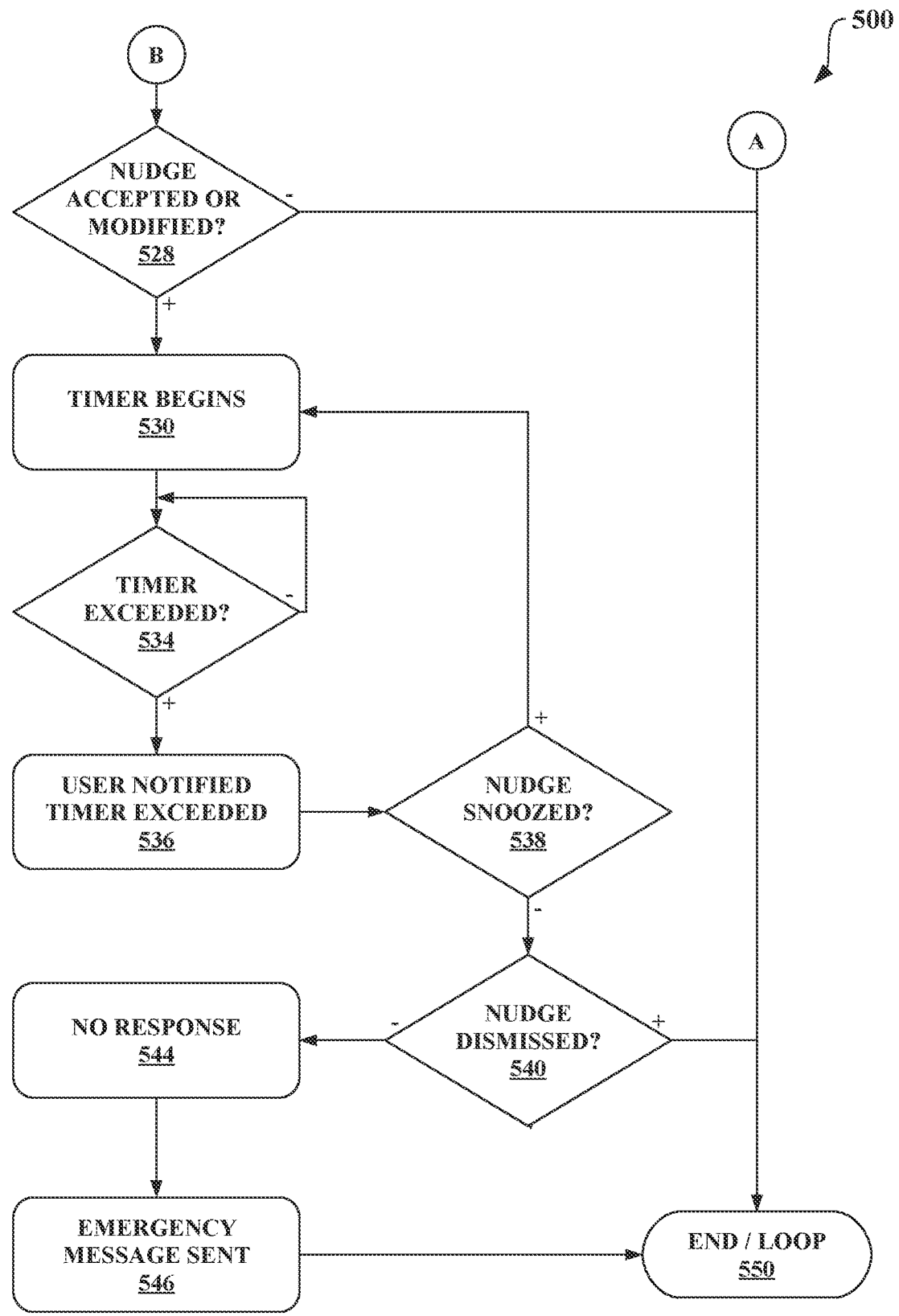
FIG. 6B is a schematic flow chart diagram of a second portion of a process for a vehicle to determine or approximate an estimated absence time and send a nudge to a user.

FIGS. 6A and 6B are a schematic flow chart diagram of a vehicle determination or nudge process, illustrated as a process or method 500. The method 500 is split into separate figures connected by A and B connectors.

Step 510: START. At step 510 the method 500 initializes or starts. The method 500 may begin operation when called upon by the controller 16, may be constantly running, or may be looping iteratively.

Step 512: VEHICLE LOCKED? At step 512 the method 500 determines whether the vehicle, such as the first vehicle 12, has been locked. If the vehicle has not been locked, the method 500 likely proceeds to an end/loop step.

Step 514: GPS INFORMATION LOGGED. At step 514, if step 512 determines that the vehicle was locked, the method 500 logs information from the GPS. The method 500 may log numerous bits of information from the GPS system, which is part of, or in communication with, the controller 16. The information may include, without limitation, the position of the first vehicle 12 and the time that the first vehicle 12 was locked. Following logging of the GPS information, the method 500 proceeds to step 516 and step 518.

Step 516: GPS CLOSE TO PREVIOUS LOCATION? At step 516 the method 500 determines whether the first vehicle 12 has been parked nearby to a previous location. For example, and without limitation, the GPS may determine that the location is within a quarter mile (approximately 400 meters) of a previously logged position. If step 516 is determined negatively, the method 500 likely proceeds to an end/loop step.

Step 518: NAVIGATION ENDED AT PREVIOUS DESTINATION? At step 518 the method 500 determines whether the first vehicle 12 has been parked at a location at which the vehicle was previously parked. For example, and without limitation, the GPS, the controller 16, or the centralized location 24, may log the previous destinations. If step 518 is determined negatively, the method 500 likely proceeds to an end/loop step.

Step 520: VEHICLE RECALLS PREVIOUS EVENTS. At step 520, if step 516 or 518 determines that the vehicle is at, or close to, a previous location, the method 500 recalls previous events of the vehicle, such as the first vehicle 12.

The method 500 may recall numerous bits of information from the GPS system or the centralized location 24. The information may include, without limitation, the previous durations of the first vehicle 12 being parked at, or near, that location, and/or the time duration during which the user 14 left the first vehicle 12 at, or near, that location.

Step 524: PATTERN IDENTIFIED? The information obtained at step 520 helps the method 500 determine whether there is an identified pattern at step 524. The pattern could be an approximate duration of the stay or an approximate leave time. Furthermore, the pattern may be cross referenced against the days of the week, such that an extended stay or leave time may be more likely on a weekday or on a weekend. If step 524 determines that no pattern is identified, the method 500 likely proceeds to an end/loop step.

Step 526: USER MESSAGED FOR NUDGE. At step 526, if step 524 determines that there is likely a pattern, the method 500 messages the user 14 with a nudge to set an estimated away time and/or an emergency message and ICE contact information. The nudge may be created by artificial intelligence (AI) at, for example and without limitation, the centralized location 24 or another networked location. Note that the nudge may include preprogrammed information for both the away time, the emergency message, or the ICE contacts. Therefore, the user 14 may simply accept or acknowledge the nudge, and the method 500 will automatically send, if needed, when appropriate.

Alternatively, or in addition to sending the nudge request to the user 14, the user 14 may choose contacts to which the nudge request may be sent. For example, and without limitation, the user 14 may define remote users to which the nudge may be sent, including: a partner, one or more parents, a caregiver, or similar, as will be understood by skilled artisans.

Step 528: NUDGE ACCEPTED OR MODIFIED? At step 528 the method 500 determines whether the user 14 has accepted and/or modified the nudge request from the system. For example, and without limitation, the user 14 may modify the nudge due to a change in the plans, including the estimated time away or the planned route to be taken. Alternatively, and without limitation, the user 14 may cancel the nudge, because the user 14 will not actually be leaving the first vehicle 12. If the user 14 neither accepts nor modifies, or the user 14 cancels the nudge, the method 500 likely proceeds to an end/loop step.

Step 530: TIMER BEGINS. If step 528 determines that the user 14 has accepted or modified the nudge, at step 526 the method 500 begins running the timer for the estimated away time and/or a grace period.

Step 534: TIMER EXCEEDED? At step 534 the method 500 determines whether the timer, with or without the grace period, has been exceeded or expired. If the step 534 determines that the timer has not expired, the method 500 loops back on itself, likely with a pause, before rechecking whether the timer has ended or expired.

Step 536: USER NOTIFIED TIMER EXPIRED. If step 534 determines that the timer has expired, at step 536 the method 500 notifies the user 14 that the timer has been exceeded.

Step 538: NUDGE/TIMER SNOOZED? At step 538 the method 500 determines whether the user 14 has snoozed the timer or the nudge notification. If the step 538 determines that the user 14 has requested a snooze, the method 500 loops back to step 530 to start the timer again, as the snooze operates as a new, or restarted, timer.

Step 540: NUDGE DISMISSED? If step 538 determines that no snooze has been requested, at step 540 the method 500 determines whether the user 14 has dismissed the nudge notification. If the step 540 determines that the user 14 has dismissed the nudge, the method 500 likely proceeds to an end/loop step.

Note that either step 538 or step 540 may require the user 14 to enter a password, if one has been selected. However, because the nudge system is determined by the first vehicle 12 or the centralized location 24, it may be unlikely that the user 14 sets a password for the nudge snooze or dismissal.

Step 544: NO RESPONSE. If step 540 determines that the user 14 has not dismissed the nudge, the method 500 notes that no response has been submitted by the user 14 to the notification that the timer has expired. Therefore, it is likely that the user 14 has not received the notification or is, possibly, in a dangerous situation.

Step 546: SEND EMERGENCY MESSAGE. At step 546 the method 500 sends the emergency message on behalf of the user 14. The emergency message may include any of the features discussed herein, including, without limitation, the alert to authorities 20, notification of ICE contacts, or use of V2X 32 to send the emergency message from a non-coverage area.

Step 550: END/LOOP. After sending the emergency message or following one of the other paths leading to the end/loop, the method 500 ends or loops. The end/loop step may then proceed, if necessary, back to the start step 510.

The detailed description and the drawings or figures are supportive and descriptive of the subject matter herein. While some of the best modes and other embodiments have been described in detail, various alternative designs, embodiments, and configurations exist.

Furthermore, any examples shown in the drawings, or the characteristics of various examples mentioned in the present description, are not necessarily to be understood as examples independent of each other. Rather, it is possible that each of the characteristics described in one of the examples of an embodiment can be combined with one or a plurality of other desired characteristics from other examples, resulting in other examples not described in words or by reference to the drawings. Accordingly, such other examples fall within the framework of the scope of the appended claims.

The invention claimed is:

1. A method of using a vehicle to alert to potential risks, comprising:
   determining that a user of the vehicle will be absent;
   determining an estimated absence time that the user will be absent from the vehicle;
   sending an alert to authorities, via a control system of the vehicle, if the user does not return within the estimated absence time; and
   receiving a user-defined emergency message via the control system, having at least one of: the user's name, a date, or a trip registry,
   wherein the vehicle does the processing for the potential risks.

2. The method of claim 1, further comprising:
   receiving the estimated absence time from the user to the control system.

3. The method of claim 2, wherein the user defines the absence and inputs the estimated absence time to the vehicle through a centralized location, and further comprising:

sending the alert to authorities from the centralized location without involvement of the vehicle.

4. The method of claim 3, further comprising:
determining that the vehicle is likely headed into a non-coverage area; and
prompting the user to define a trip registry, via the control system, to the centralized location prior to entering the non-coverage area.

5. The method of claim 2, further comprising:
autonomously driving the vehicle to a coverage area to send the alert to authorities when the vehicle is parked in a non-coverage area.

6. The method of claim 1, further comprising:
a centralized location, wherein the control system of the vehicle or the centralized location determines the absence and the estimated absence time.

7. The method of claim 6, further comprising:
autonomously driving the vehicle to a coverage area to send the alert to authorities when the vehicle is parked in a non-coverage area.

8. The method of claim 6, further comprising:
using vehicle-to-everything (V2X) to send the send the alert to authorities, wherein the vehicle is a first vehicle,
wherein one of a second vehicle or other connected device carries the alert to a coverage area, after the first vehicle messages the second vehicle or the other connected device via V2X and sends the alert to authorities.

9. The method of claim 6,
wherein the user defines the alert to authorities with an emergency message having name, date, medical information, or trip registry.

10. The method of claim 6, further comprising:
following expiration of the estimated absence time, detecting a pedestrian near the vehicle; and
playing a pre-recorded emergency message through one or more speakers of the vehicle, such that the pedestrian is made aware of the pre-recorded emergency message.

11. The method of claim 6, further comprising:
periodically sounding a horn of the vehicle in an SOS pattern; or
periodically flashing lights of the vehicle in an SOS pattern; and
decaying the horn or flashing lights to retain charge of a battery of the vehicle.

12. The method of claim 6, wherein the vehicle predicts entrance into a non-coverage area, and further comprising:
prompting the user with the control system to define a trip registry to a centralized location prior to entering the non-coverage area.

13. The method of claim 6, further comprising:
linking a short-range electronic device with the control system of the vehicle, wherein the short-range electronic device is configured to monitor biometric limits and determine exceedance thereof;
sending the short-range electronic device a short-range alert at expiration of the estimated absence time or the exceedance of the biometric limits; and
allowing the user to end or snooze the short-range alert via the short-range electronic device.

14. A non-transitory computer-readable storage medium on which is recorded instructions, wherein execution of the instructions by a processor causes the processor to:
determine that a user of a vehicle will be absent;
estimate an absence time;
send an alert to authorities if the user does not return within the estimated absence time that the user will be absent from the vehicle;
wherein either the user defines the absence and inputs the estimated absence time to the vehicle, or the vehicle determines the absence and the estimated absence time, such that the vehicle does the processing for the potential risks; and
receiving a user-defined emergency message via a vehicle control system, having at least one of: the user's name and date or a trip registry.

15. The non-transitory computer-readable storage medium of claim 14, further comprising:
sending the user a nudge at expiration of the estimated absence time; and
allowing the user to snooze the nudge.

16. The non-transitory computer-readable storage medium of claim 14, further comprising:
determining that the vehicle is in a non-coverage area;
using vehicle-to-everything (V2X) to send the send the alert to authorities;
wherein the vehicle is a first vehicle and wherein a second vehicle or other connected device carries the alert to a coverage area, after the first vehicle messages the second vehicle or the or other connected device via V2X; and
wherein the second vehicle or other connected device sends the alert to authorities.

17. The non-transitory computer-readable storage medium of claim 14, further comprising:
linking a short-range electronic device with the vehicle;
sending the short-range electronic device a short-range alert at expiration of the estimated absence time; and
allowing the user to end or snooze the short-range alert via the short-range electronic device.

18. The non-transitory computer-readable storage medium of claim 17, further comprising:
associating biometric limits with the short-range electronic device, and allowing the user to define when the biometric limits are exceeded;
sending the short-range electronic device the short-range alert when the biometric limits are exceeded; and
if the user does not end or snooze the short-range alert via the short-range electronic device, sending the alert to authorities.

19. The non-transitory computer-readable storage medium of claim 14, further comprising:
determining that the vehicle is likely headed into a non-coverage area; and
prompting the user to define a trip registry to a centralized location prior to entering the non-coverage area.

* * * * *